Patented Nov. 13, 1951

2,575,224

UNITED STATES PATENT OFFICE 2,575,224

THIOPHOSPHATES

Richard H. F. Manske, Robert W. Beattie, and Marshall Kulka, Guelph, Ontario, Canada, assignors to United States Rubber Company, New York, N. Y., a corporation of New Jersey No Drawing. Application July 17, 1948,
Serial No. 39,376

5 Claims. (Cl. 260—461)

This invention relates to thiophosphates and more particularly to an improved method of making O-alkyl - O - alkyl-O-p-nitrophenylthiophosphates and to new O-alkyl-O-alkyl-O-p-nitrophenylthiophosphates.

O - O - diethyl - O - p - nitrophenylthiophosphate which has attained considerable importance as an insecticide has been heretofore made by reacting thiophosphoryl chloride with sodium ethylate in ethanol, followed by isolation of the resulting O,O-diethyl chlorothiophosphate and conversion thereof to the desired O,O-diethyl-O-p-nitrophenylthiophosphate. In this process, as heretofore carried out, the intermediate product was isolated from the alcohol solution by pouring the reaction mixture into water. This process has many disadvantages, among which are the low yields of the intermediate and the necessity for the recovery of the alcohol from an aqueous solution.

We have discovered a process of making O-alkyl - O - alkyl - O - p - nitrophenylthiophosphates which presents many advantages over the previously-used process.

Our invention is based on the discovery that O - alkyl - O - alkyl - O - p - nitrophenylthiophosphate may be made in a highly improved manner by reacting thiophosphoryl chloride with a lower alkanol in the presence of benzene to form $PSCl_2(OR)$ where R is the alkyl group of said alkanol, isolating the $PSCl_2(OR)$ from the resulting reaction mixture, reacting the $PSCl_2(OR)$ with an alkali metal alcoholate of a lower alkanol in solution in a lower alkanol to form $PSCl(OR)(OR_1)$ where $R_1$ is the alkyl group of the alkali metal alcoholate, commingling the resulting mixture directly with an alkali metal p-nitrophenolate, and reacting the alkali metal p-nitrophenolate with the $PSCl(OR)(OR_1)$ to form the desired O-alkyl-O-alkyl-O-p-nitrophenylthiophosphate.

We have discovered that many advantages are obtained by carrying out the reaction between the thiophosphoryl chloride and the lower alkanol in benzene solution. Among these advantages are a considerable increase in yield of the intermediate $PSCl_2(OR)$ often to a figure of the order of from 70% to 85% and a minimizing of side reactions. We have also discovered that optimum results are obtained in the step of reacting the thiophosphoryl chloride with the lower alkanol in the presence of benzene if the lower alkanol is used in an amount ranging from 1.5 to 2.5 moles per mole of thiophosphoryl chloride.

The benefits derived by the use of benzene as the solvent and by the use of an excess of the lower alkanol in the first step of our process are illustrated in the following table, which gives the yields of O-ethyl dichlorothiophosphate obtained from one mole (169.5 g.) of thiophosphoryl chloride, using benzene as the solvent.

| Ethanol, moles | Benzene, cc. | Time Refluxing, Hrs. | Per Cent Yield |
|---|---|---|---|
| 2 | 333 | 4 | 45 |
| 2 | 500 | 4 | 50 |
| 2 | 600 | 4 | 62 |
| 2 | 1,000 | 4 | 72 |
| 2 | 1,000 | 4 | 75 |
| 1 | 1,000 | 4 | 40 |
| 1 | 1,000 | 4 | 40 |
| 2 | 2,000 | 4 | 50 |
| 2 | 2,000 | 9 | 64 |
| 2 | 2,000 | 15 | 71 |

From the table it will be seen that the maximum yield is obtained at a diluton of one litre of benzene per mole of thiophosphoryl chloride. At higher dilutions a considerably longer heating time is necessary. We prefer to employ benzene in an amount ranging from 10 to 12 moles of benzene per mole of thiophosphoryl chloride taken. The table also shows that the use of one mole excess of the alkanol (i. e., a total of two moles of the alkanol per mole of the thiophosphoryl chloride) gives much better yields than the use of the stoichiometric amount thereof.

In a preferred embodiment of our invention, the excess of lower alkanol used in the first step is not wasted but is recovered from the reaction mixture resulting from the first step and is used in subsequent runs. We prefer to recover the unreacted lower alkanol in admixture with the benzene and thiophosphoryl compounds which are lower-boiling than the $PSCl_2(OR)$ by fractional distillation and to use this recovered mixture as a source of lower alkanol, the benzene and partial reaction products in a subsequent operation. By operating in this manner, it is necessary, in subsequent runs, to add only approximately one-quarter of a mole of fresh lower alkanol in excess over the one mole theoretically required, in order to have the lower alkanol present in a one mole excess. Furthermore, the yields of $PSCl_2(OR)$ obtained in successive runs by using the recovered fraction containing the unreacted lower alkanol and the benzene (and partial reaction products) are successively higher; in a typical operation of our process, yields of 73, 84, 85 and 88% of O-ethyl dichlorothiophosphate were obtained in four successive runs.

The first step of our process is preferably conducted by heating a mixture of the thiophosphoryl chloride, the lower alkanol and the benzene to boiling, preferably under reflux, until the reaction has taken place to the desired extent, typically for several hours, a time of 4 hours often being sufficient.

The reaction mixture from the first step of our process is treated in any suitable manner to isolate the $PSCl_2(OR)$ contained therein. We prefer to fractionally distill the reaction mixture to recover a first fraction, as just described, which is used in subsequent runs. The PSCl₂(OR) may be isolated from the residual mixture by continuing the distillation and recovering it as the next fraction. Preferably the distillation is conducted under reduced pressure of not over 25 mm. to prevent decomposition.

The thus-isolated PSCl₂(OR) is next reacted with an alkali metal alcoholate in solution in a lower alkanol, almost invariably the alkanol from which the alcoholate was formed by reaction with alkali metal, usually sodium. We have found it essential, in order to obtain high yields, to use a temperature of not over 10° C. in this step of the synthesis. The higher the temperature used, the lower the yields obtained. We prefer to use a temperature of not over 0° C. In this step of our process we use the alkali metal alcoholate in an amount substantially stoichiometrically equivalent (i. e., equimolecular) to the amount of the PSCl₂(OR) taken. The alkali metal alcoholate is in solution in a relatively large amount of the corresponding lower alkanol. The amount of the lower alkanol employed as the solvent medium in this step preferably ranges from 5 to 15 moles per mole of the PSCl₂(OR). The mixture is stirred until reaction is substantially complete, this usually requiring from one to three hours. It is preferable to add the solution of the alkali metal alcoholate in the corresponding alkanol to the PSCl₂(OR) gradually over a period of time from one to two hours, the mixture being stirred after addition is complete for an additional period of time until reaction is complete. During the addition and during the subsequent period the temperature is preferably kept at not over 0° C. This converts the PSCl₂(OR) to PSCl(OR)(OR₁)

The resulting PSCl(OR)(OR₁) is not isolated from the resulting reaction mixture but is treated directly with an alkali metal p-nitrophenolate, which is added directly to the reaction mixture in an amount which preferably is approximately stoichiometrically equivalent (i. e. equimolecular) to the amount of PSCl(OR)(OR₁) present. The resulting mixture is then heated to boiling, preferably under reflux, for a time sufficient to effect reaction of the alkali metal p-nitrophenolate with the PSCl(OR)(OR₁) to form the desired product. The resulting mixture is then treated in a suitable way to recover the product therefrom, conveniently by distilling off the alkanol which where anhydrous alkali metal p-nitrophenolate was employed can be directly used in subsequent operations, adding benzene to the residual mixture, washing out the salt from the resulting mixture with water, and removing the benzene from the washed material by distillation.

Our invention may be employed to produce any compound having the general formula

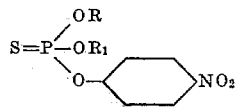

where R and R₁ are lower alkyl groups. R and R₁ may be any lower alkyl group, having from one to six carbon atoms. R and R₁ may be the same or different alkyl groups. R and R₁ are determined by the selection of the alkanol used in the first step and of the alkanol from which the alcoholate used in the second step is formed. In some cases a mixture of lower alkanols may be used in the first step. Similarly a mixture of alcoholates of lower alkanols may be used in the second step. Any of the C₁ to C₆ alkanols may be used in either of the first two steps of our process. Thus we may use methyl, ethyl, propyl, butyl, pentyl or hexyl alcohols or mixtures thereof.

Our invention may be used to produce the compound

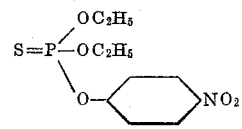

which is already known as a powerful insecticide. Our invention may also be used to prepare the following compounds, namely compounds having the general formula

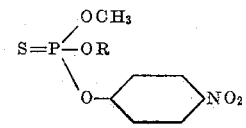

where R is any lower alkyl group. Examples of the latter types of compounds are: O,O-dimethyl-O-p-nitrophenylthiophosphate, O-methyl-O-ethyl-O - p - nitrophenylthiophosphate, O-methyl-O-propyl-O-p- nitrophenylthiophosphate and O-methyl-O-butyl - O - p - nitrophenylthiophosphate. The dimethyl, methyl ethyl and methyl propyl derivatives are cheaper to prepare than the diethyl derivative. Those derivatives in which one alkyl group is methyl and the other is ethyl or higher are believed to be new chemicals.

Our invention may also be employed to produce O-ethyl-O-propyl - O - p - nitrophenylthiophosphate, which is also believed to be a new chemical.

The following examples illustrate our invention in more detail.

EXAMPLE 1

*O,O-diethyl-O-p-nitrophenylthiophosphate*

To a solution of dry benzene (4 l.) and thiophosphoryl chloride (678 g. 4 moles) was added absolute ethanol (368 g. 8 moles) and the solution heated under reflux for 4 hours. The benzene was distilled off and the residue fractionated through a short column. The material boiling below 52° (10 mm.) was combined with the recovered benzene and reserved for the next run. The O-ethyl dichlorothiophosphate, a colorless liquid distilled at 52° (10 mm.) or 65° (23 mm.), yield 502 g. or 71%, non-distillable residue, 100 g. In other runs using the recovered benzene successively and one quarter mole excess of ethanol, the yields were 78, 80, and 82%.

The O-ethyl dichlorothiophosphate (179 g. 1 mole) was placed in a 2 l. three-neck flask equipped with a thermometer and stirrer. It was stirred and kept below 0° while a solution of sodium metal (23 g.) in commercial absolute ethanol (600 cc.) was added over a period of about one and one-half hours. After stirring for an additional half hour, anhydrous sodium p-nitrophenolate (158 g.) was added and the reaction mixture heated under reflux for 10 minutes. The ethanol was distilled off and reserved. To the residue benzene (500 cc.) was added and the salt washed out with water. Removal of the benzene yielded a dark amber oil (249 g. or 85.8%) of O,O-diethyl-O-p-nitrophenylthiophosphate.

EXAMPLE 2

O-methyl-O-ethyl-O-p-nitrophenylthiophosphate

To O-ethyl dichlorothiophosphate (268.5 g. 1.5 moles, prepared as in Example 1) cooled below 0° was added with stirring a solution of sodium metal (34.5 g.) in methanol (900 cc.) over a period of about one and one-half hours. The temperature was maintained at 0° or below. After stirring for an additional one-half hour, anhydrous sodium p-nitrophenolate (241.5 g. 1.5 moles) was added. The reaction mixture was heated under reflux for 10 minutes and then the methanol distilled off. To the cooled residue benzene (750 cc.) was added and the salt washed out with water. The benzene was removed yielding (380 g. or 91.5 %) O-methyl-O-ethyl-O-p-nitrophenylthiophosphate as a dark amber oil.

EXAMPLE 3

O,O-dimethyl-O-p-nitrophenylthiophosphate

To a solution of benzene (2 l.) and thiophosphoryl chloride (339 g. 2 moles) was added commercial absolute methanol (128 g. 4 moles) and the solution heated under reflux for 4 hours. The benzene was distilled off and the residue fractionated. The O-methyl dichlorothiophosphate was a colorless liquid distilling at 47° (15 mm.)

To O-methyl dichlorothiophosphate (247.5 g. 1.5 mole) cooled below 0° was added with stirring a solution of sodium metal (34.5 g.) in methanol (900 cc.) over a period of about one and one-half hours. The temperature was maintained at 0° or below. After stirring for an additional one-half hour sodium p-nitrophenolate (241.5 g.) was added. The reaction mixture was heated under reflux for 10 minutes and the methanol distilled off. To the cooled residue was added 750 cc. of benzene and the salt washed out with water. Removal of the benzene yielded O,O-dimethyl-O-p-nitrophenylthiophosphate as a dark amber oil, yield, 348 g. or 88%.

EXAMPLE 4

O-methyl-O-n-propyl-O-p-nitrophenylthiophosphate

To a solution of dry benzene (1 l.) and thiophosphoryl chloride (169.5 g. 1 mole) was added n-propyl alcohol (120 g. 2 moles) and the solution heated under reflux for 4 hours. The benzene was distilled off and the residue distilled from a Claisen flask, B. P. (10 mm.) = 70-75° mostly 73°, yield of colorless liquid, 122 g. or 64%. Using the recovered benzene in another run and one-quarter mole excess of propyl alcohol per mole of thiophosphoryl chloride, the yield was 83%.

To the O-n-propyl dichlorothiophosphate (290 g. 1.5 mole) prepared as above cooled below 0° was added with stirring a solution of sodium metal (34.5 g.) in absolute methanol (600 cc.) over a period of about one and one-half hours. The temperature was maintained at 0° or below. After stirring for an additional one-half hour sodium p-nitrophenolate (237 g.) was added. The reaction mixture was heated under reflux for ten minutes and then the methanol was distilled off. To the cooled residue 750 cc. of benzene was added and the salt was washed out with water. Removal of benzene yielded O-methyl-O-n-propyl-O-p-nitrophenylthiophosphate as a dark amber oil, yield 405 g. or 94%.

EXAMPLE 5

O-methyl-O-butyl-O-p-nitrophenylthiophosphate

To dry benzene (1 l.) was added thiophosphoryl chloride (169.5 g. 1 mole) and butanol (148 g. 2 moles) and the solution heated under reflux for 5 hours. The benzene was removed and the residue distilled, B. P. (15 mm.) = 88°; yield of colorless liquid was 147 g. or 71%. Using the benzene recovered for the first run in subsequent runs with one and one-quarter moles of butanol for each mole of thiophosphoryl chloride the yields were 82 and 78%.

To O-butyl dichlorothiophosphate (310 g. 1.5 moles) prepared above cooled below 0° was added with stirring a solution of sodium (34.5 g.) in absolute methanol (900 cc.) over a period of about 2 hours. The temperature was maintained at 0° or below. After stirring for an additional one-half hour sodium p-nitrophenolate (241.5 g.) was added. The reaction mixture was heated under reflux for 10 minutes and then the methanol was distilled off. To the cooled residue benzene (750 cc.) was added and the salt washed out with water. Removal of the benzene yielded O - methyl - O - butyl - O - p - nitrophenylthiophosphate as a dark amber oil, yield 417 g. or 90%.

EXAMPLE 6

O-ethyl-O-n-propyl-O-p-nitrophenylthiophosphate

O-n-propyl dichlorothiophosphate (PSCl₂OPr) (290 g., 1.5 moles) was stirred and cooled below 0°. To this was added a solution of sodium (34.5 g.) in absolute ethanol (900 cc.) over a period of about 1.5 hrs. The temperature of the reaction mixture was maintained at 0° or below by cooling. After stirring for an additional one-half hour at 0°, to the reaction mixture anhydrous sodium p-nitrophenolate (240 g.) was added. The cooling bath was removed and the reaction mixture was heated under reflux for about 15 minutes. Then the ethanol was distilled off. To the residue benzene (750 cc.) was added and the salt was washed out with water. The benzene was removed leaving an amber oil, yield, 399 g. or 87.5%.

When we make a derivative wherein one O-alkyl group is methyl and the other O-alkyl group is a higher alkyl group (C₂ to C₆), we prefer to introduce such higher O-alkyl group first by use of the corresponding alcohol and to introduce the O-methyl group in the second step of the process for the reason that if the O-methyl group is introduced in the first step of the process, the yield of O-methyl dichlorothiophosphate is not as high as the yields of the higher O-alkyl derivatives. For example, the yield of O-methyl dichlorothiophosphate when the procedure of the first paragraph of Example 3 is followed is 47% using fresh benzene and 57% using recovered benzene with a one-quarter mole excess of fresh methanol. But by introducing a higher O-alkyl group first and then introducing the O-methyl group, considerably better yields of the desired derivatives are obtained.

In practicing our invention we prefer to employ anhydrous materials and to carry out the steps of the synthesis under anhydrous conditions. However we may employ a water-containing alkali metal p-nitrophenolate, such as the commercially available sodium salt of p-nitrophenol which contains about 21-23% of water which corresponds to approximately $$NO_2C_6H_4ONa \cdot 2H_2O$$

in the last step of the synthesis although such use has the disadvantages that the yield is generally substantially lower (other conditions being the same) and that the alcohol recovered from the process contains the water present in the alkali p-nitrophenolate used and has to be rectified and dried before it can be used again in the process.

Following is an example of the practice of our invention using water-containing sodium p-nitrophenolate in the last step.

EXAMPLE 7

*O,O-diethyl-O-p-nitrophenylthiophosphate*

The O-ethyl dichlorothiophosphate (269 g., 1.5 moles) was placed in a 2-l., three-necked flask equipped with a thermometer, condenser, and mechanical stirrer. It was stirred and while holding the temperature below 0° C., a solution of metallic sodium (36.2 g., 5% excess) dissolved in commercial absolute ethanol (900 cc.) was added slowly over a period of about two hours. After stirring an additional half hour, the cooling bath was removed and 300 g. of commercially available hydrated sodium p-nitrophenolate (21-23% moisture content) was added and the stirred reaction mixture heated to boiling and refluxed about 30 minutes. When the hydrated sodium p-nitrophenolate was first added the color was a canary-yellow and after the 30 minute refluxing it was a tan or fawn color. The ethanol was removed by distillation and reserved. To the residue benzene (750 cc.) was added and the soluble sodium salts washed out with water. Removal of the benzene yielded a dark amber oil (397.5 g. or 90%) of O,O,diethyl-O-p-nitrophenylthiophosphate.

The products made by Examples 2, 3 and 4 were tested in comparison with O,O-diethyl-O-p-nitrophenylthiophosphate for their insecticidal activity with respect to both mosquito larvae and greenhouse red spider mite with the following results.

| | Per cent Mortality, *Aedes aegypti*, Mosquito larvae | | | |
|---|---|---|---|---|
| Concentration, Parts per Million | 0.1 | 0.004 | 0.02 | 0.01 |
| Compound Tested | | | | |
| O,O-Diethyl-O-p-Nitrophenylthiophosphate | 100 | 100 | 100 | 98 |
| O-Methyl-O-Ethyl-O-p-Nitrophenylthiophosphate | 100 | 100 | 100 | 100 |
| O,O-Dimethyl-O-p-Nitrophenylthiophosphate | 100 | 100 | 100 | 100 |
| O-Methyl-O-n-Propyl-O-p-Nitrophenylthiophosphate | 100 | 100 | 100 | 100 |

| | Per cent Mortality, 48 hr., Greenhouse red spider mite | | |
|---|---|---|---|
| Concentration, Parts per Million | 100 | 10 | 5 |
| Compound Tested | | | |
| O,O-Diethyl-O-p-Nitrophenylthiophosphate | 100 | 86 | 65 |
| O-Methyl-O-Ethyl-O-p-Nitrophenylthiophosphate | 100 | 97 | 75 |
| O,O-Dimethyl-O-p-Nitrophenylthiophosphate | 100 | 50 | 0 |
| O-Methyl-O-n-Propyl-O-p-Nitrophenylthiophosphate | 100 | 72 | 16 |

It will be seen that each of the dimethyl, methylethyl, and methyl n-propyl compounds exhibited insecticidal activity comparable with that exhibited by the diethyl compound. The methyl ethyl compound appears to be superior to the diethyl compound with respect to the red spider mite.

From the foregoing description it will be seen that we have invented a process of making O-alkyl-O-alkyl-O-p-nitrophenylthiophosphates which offers many advantages over the previous method of making compounds of this type. The process of our invention is distinguished by its effectiveness and particularly by the high yields which are obtainable in accordance therewith. The process makes possible the ready recovery and re-use of the benzene and the alcohols. By recovering the benzene in admixture with the unreacted alcohol of the first step and the thiophosphoryl compounds which are lower boiling than the PSCl$_2$(OR) formed in the first step and using this mixture in subsequent operations, a substantial further increase in yield is made possible. The process of our invention is also advantageous in that isolation of the intermediate PSCl(OR)(OR$_1$) is rendered unnecessary. Still another advantage of our process is that the alcohol which was added as a carrying and reaction medium for the reaction between the PSCl$_2$(OR) and the alkali metal alcoholate is readily recovered in anhydrous form ready for immediate re-use in the process in the preferred practice thereof where anhydrous alkali metal p-nitrophenolate is employed. It will also be seen that we have made available new derivatives which have insecticidal activity comparable with the diethyl compound heretofore available. Numerous other advantages of our invention will be apparent to those skilled in the art.

Having thus described our invention, what we claim and desire to protect by Letters Patent is:

1. A method of making an O-alkyl dichlorothiophosphate which comprises refluxing an anhydrous mixture of thiophosphoryl chloride, a lower alkanol and benzene in proportions of from 1.5 to 2.5 moles of said lower alkanol and from 10 to 12 moles of said benzene per mole of thiophosphoryl chloride.

2. A method of making O-ethyl dichlorothiophosphate which comprises refluxing an anhydrous mixture of thiophosphoryl chloride, ethyl alcohol and benzene in proportions of from 1.5 to 2.5 moles of said ethyl alcohol and from 10 to 12 moles of said benzene per mole of thiophosphoryl chloride.

3. A method of making a compound having the general formula PSCl(OR)(OR$_1$) where R and R$_1$ are different lower alkyl groups which comprises refluxing a mixture of thiophosphoryl chloride, a lower alkanol and benzene in proportions of from 1.5 to 2.5 moles of said lower alkanol and from 10 to 12 moles of said benzene per mole of thiophosphoryl chloride, and thereby forming PSCl$_2$(OR) where R is the lower alkyl group of said alkanol, reacting said PSCl$_2$(OR) with an alkali metal alcoholate of a different lower alkanol in the corresponding lower alkanol at a temperature of not over 10° C., and thereby forming PSCl(OR)(OR$_1$), where R$_1$ is the lower alkyl group of said alcoholate.

4. A method of making a compound having the general formula PSCl(OCH$_3$)(OR) where R is an alkyl group having from two to six carbon atoms which comprises refluxing a mixture of thiophosphoryl chloride, an alkanol having the formula ROH where R is an alkyl group having from two to six carbon atoms, and benzene in proportions of from 1.5 to 2.5 moles of said alkanol and from 10 to 12 moles of said benzene per mole of thiophosphoryl chloride, and thereby forming $PSCl_2(OR)$ where R is said alkyl group, reacting said $PSCl_2(OR)$ with an alkali metal methylate in methyl alcohol at a temperature of not over 10° C., and thereby forming $PSCl(OCH_3)(OR)$.

5. A method of making O-methyl-O-ethyl chlorothiophosphate which comprises refluxing a mixture of thiophosphoryl chloride, ethyl alcohol and benzene in proportions of from 1.5 to 2.5 moles of said ethyl alcohol and from 10 to 12 moles of said benzene per mole of thiophosphoryl chloride, and thereby forming O-ethyl dichlorothiophosphate, reacting said O-ethyldichlorothiophosphate with an alkali metal methylate in methyl alcohol at a temperature of not over 10° C., and thereby forming O-methyl-O-ethyl chlorothiophosphate.

RICHARD H. F. MANSKE.
ROBERT W. BEATTIE.
MARSHALL KULKA.

REFERENCES CITED

The following references are of record in the file of this patent:

UNITED STATES PATENTS

| Number | Name | Date |
| --- | --- | --- |
| 1,982,903 | Clemmensen | Dec. 4, 1934 |
| 2,176,416 | Britton et al. | Oct. 17, 1939 |
| 2,309,829 | Davis et al. | Feb. 2, 1943 |
| 2,506,344 | Cleary | May 2, 1950 |
| 2,520,393 | Fletcher | Aug. 29, 1950 |

OTHER REFERENCES

Mastin et al.: J. Am. Chem. Soc., vol. 67, pp. 1662–1664 (October 1945).

F. I. A. T., Final Report No. 949, "Organic Chemical Intermediates for Insecticides, Fungicides and Rodenticides," by J. T. Thurston, dated October 14, 1946, pages 19 and 20. Office of Publications Board, Department of Commerce, Publication No. PB-60890.)